July 3, 1923.
H. W. GAINES
1,460,413
SPRING WHEEL
Filed Feb. 11, 1922    2 Sheets-Sheet 1
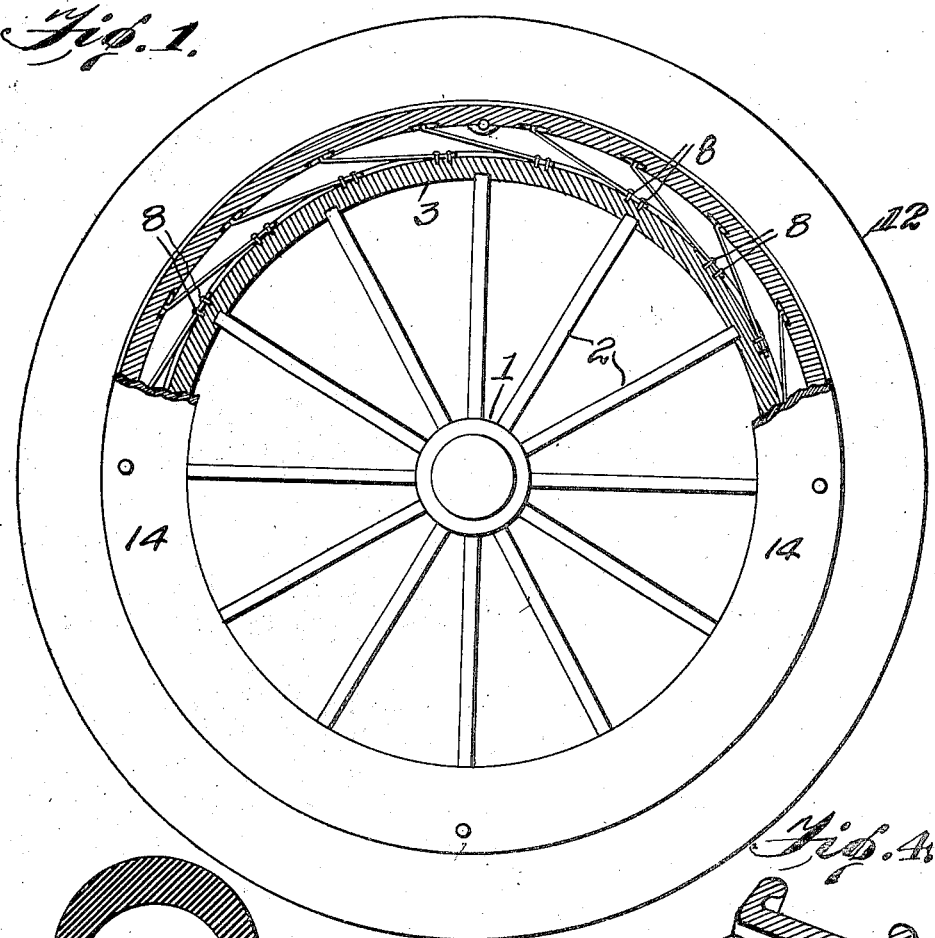
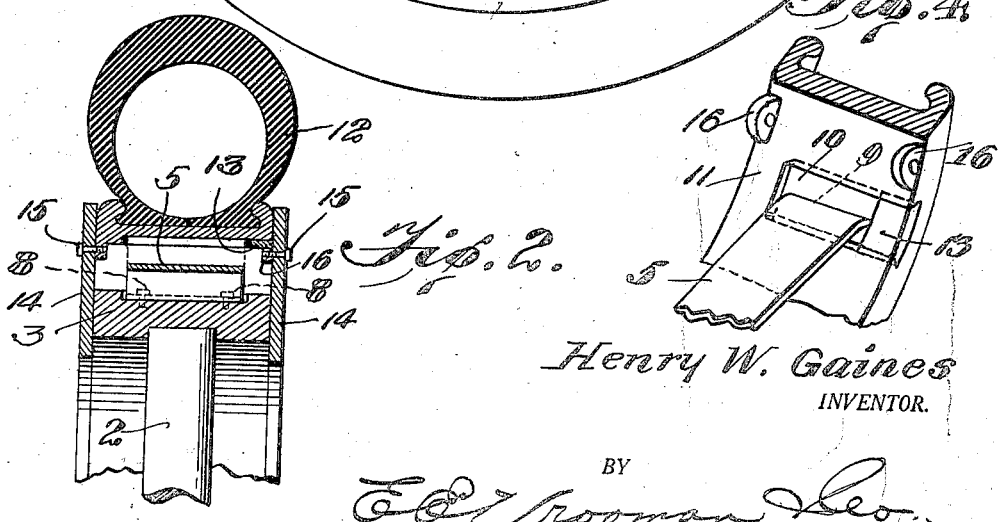
Henry W. Gaines
INVENTOR.
BY
ATTORNEYS.

July 3, 1923.
H. W. GAINES
SPRING WHEEL
Filed Feb. 11, 1922
1,460,413
2 Sheets-Sheet 2
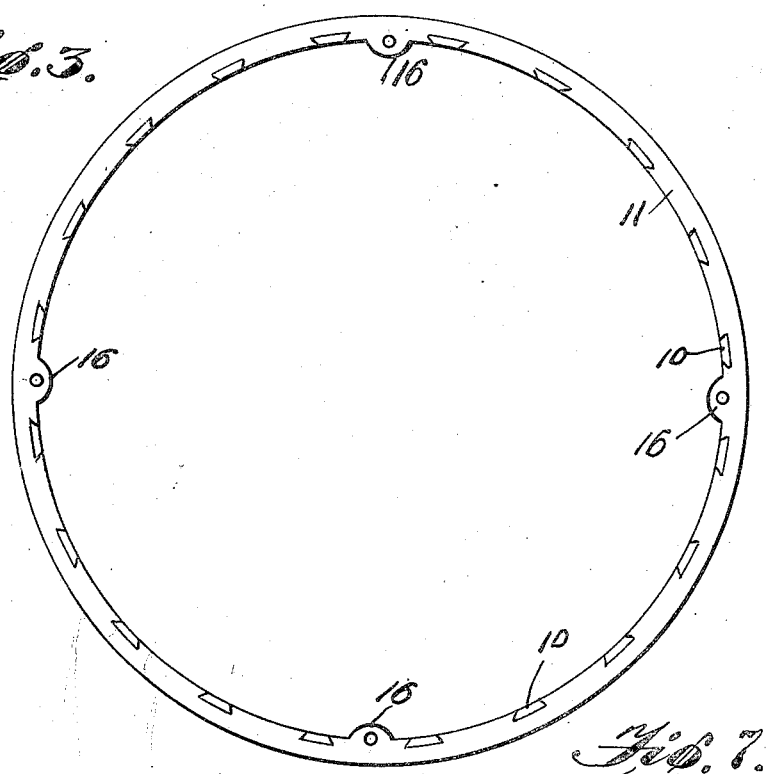
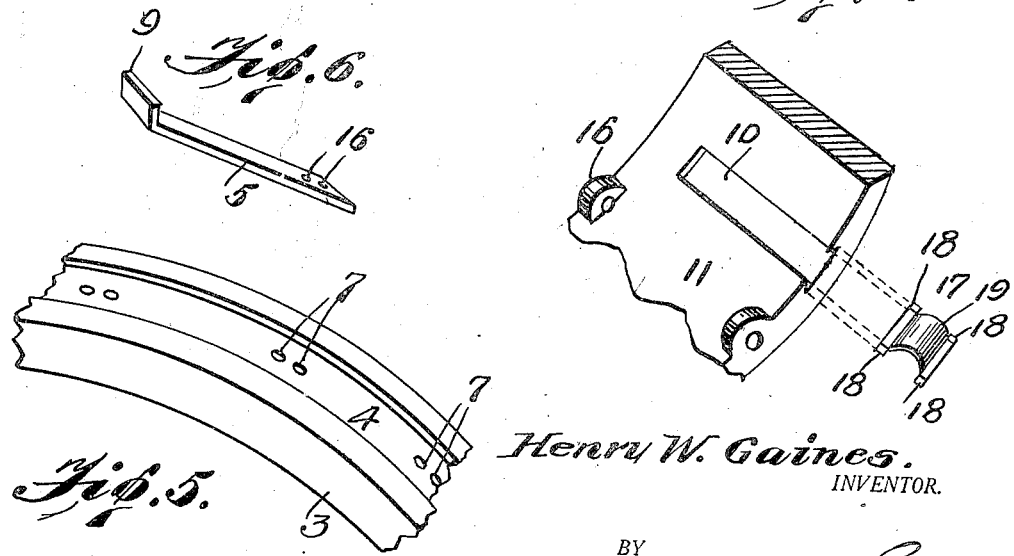
Henry W. Gaines.
INVENTOR.
BY
his ATTORNEYS.

Patented July 3, 1923.

1,460,413

UNITED STATES PATENT OFFICE.

HENRY W. GAINES, OF BOWLING GREEN, KENTUCKY.

SPRING WHEEL.

Application filed February 11, 1922. Serial No. 535,848.

*To all whom it may concern:*

Be it known that I, HENRY W. GAINES, a citizen of the United States, residing at Bowling Green, in the county of Warren and State of Kentucky, have invented certain new and useful Improvements in Spring Wheels, of which the following is a specification, reference being had therein to the accompanying drawings.

This invention relates to spring wheels, and the object of the invention is the provision of simple and efficient means for yieldably connecting the outer rim or tire of a wheel to the inner rim, and the elimination of any rattle or unnecessary noise in the construction of such a wheel.

With this and other objects in view, my invention comprises certain novel combinations, constructions and arrangements of parts as will be hereinafter described, illustrated in the accompanying drawings, and more particularly pointed out in the appended claims.

In the drawings:

Figure 1 is a view, partly in section and partly in side elevation, of a wheel constructed in accordance with the present invention.

Figure 2 is a fragmentary, transverse, sectional view, taken through Fig. 1.

Figure 3 is a view, in side elevation of the outer rim or tire of a wheel.

Figure 4 is a fragmentary, perspective view of the outer rim shown in Fig. 1, looking at the inner face thereof.

Figure 5 is a fragmentary, perspective view of the inner rim.

Figure 6 is a perspective view of one of the springs.

Figure 7 is a fragmentary, perspective view of the outer rim or tire shown in Fig. 3.

Referring to the drawings by numerals, 1 designates the hub of the wheel and 2 the spokes, upon which spokes is positioned the inner rim 3. The inner rim 3 is provided with a circumferential groove 4 for receiving the inner ends of the springs 5, and through apertures 6 and into the sockets 7 extends fastening means 8 for securing the springs upon the inner rim 3. Each spring 5 is provided with an angularly-disposed outer end 9, which end 9 is positioned in a socket 10 formed in the outer rim or tire 11. This socket 10 is preferably dovetail, and opens at one end upon one of the side-faces of the outer rim or tire, as the case may be.

It is to be understood that in the case of the outer rim shown in Figs. 1, 2 and 4, a pneumatic tire, designated by dotted line 12, may be positioned upon the outer rim, whereas if the outer rim is a tire-rim, as shown in Figs. 3 and 7, no pneumatic tire is used; I use the term "tire-rim" in a broad sense to designate either a tire rim as shown in Fig. 3, or a pneumatic tire-holding rim, as shown in Figs. 1, 2 and 4, for each (Fig. 1 and Fig. 3) is an outer rim.

While the angle ends 9 of the springs 5 have a slight movement in the sockets 10 longitudinally of the axis of the outer rim, to keep them relatively tight against lateral play, and thereby eliminate rattling or any undesirable noise, I insert dovetail plug 13 in the end of each socket 10, against the side of the spring, and when the ring-like side plates 14 are in position against the inner and outer rims, these plugs 13 will be held snug against the springs, thereby making a very efficient and compact structure for preventing any noise or rattling of the springs in the sockets 10. The side plates 14 are held in place by screws 15 passing therethrough, and these screws 15 are threaded into lugs 16 on the inner face of the outer rim. In Fig. 7 I have shown a spring plug 17 which is provided with outwardly-extending ears 18 that slide in the edges of the dovetail socket 10, and the plug is provided with an outwardly-bowed body 19, so that the plug can press tightly against the spring 5, keeping the spring relatively tight in the socket, against lateral play, thereby tending to make the wheel noiseless.

The ring-like side plates 14 will hold the outer rim 11 in position upon the inner rim and will prevent foreign substances, such as dirt or mud, from entering between the inner and outer rims.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In a wheel of the class described, the combination of an inner rim, springs attached to the inner rim, an outer rim provided in its inner face with sockets, each socket opening at one end upon the side face of the outer rim, said springs extending into said sockets, a plug in the open end of each socket and bearing against a spring, and means for holding the plugs in said sockets against accidental displacement.

2. In a wheel of the class described, the combination of an inner rim, springs secured to said inner rim, an outer rim provided on its inner face with sockets, said springs extending into said sockets, each socket provided with an open end, a removable plug in the open end of each socket, and a side plate fastened to one of the rims and overlapping both rims and securing the plugs in the sockets.

3. In a wheel of the class described, the combination of an inner rim, springs fastened to the inner rim, an outer rim provided with dovetail sockets open at one end, said springs extending into said sockets, plugs in the open ends of said sockets and provided with means extending into the side edges of the sockets, and side plates fastened to one rim and overlapping the other rim and retaining the plugs in the sockets against the springs.

4. In a wheel of the class described, the combination of an inner rim, springs fastened to the inner rim, an outer rim provided in its inner face with transversely-extending dovetail sockets, each socket opening at one end upon a side-face of the outer rim, a spring plug in each socket and bearing tightly against a spring, each spring plug comprising an outwardly-bowed body and with laterally-extending ears at each corner of the body, said ears fitting into the side-edges of the dovetail socket, ring-like side plates fastened to the outer rim and overlapping the inner rim, and said side plates holding the spring plugs in the sockets tightly against the springs, substantially as shown and described.

In testimony whereof I hereunto affix my signature.

HENRY W. GAINES.